United States Patent
Johansson et al.

(10) Patent No.: US 9,493,161 B2
(45) Date of Patent: Nov. 15, 2016

(54) METHOD AND DEVICE FOR CONTROLLING THE REFERENCE SPEED OF A DOWN-HILL SPEED CONTROLLER

(71) Applicant: SCANIA CV AB, Södertälje (SE)

(72) Inventors: Oskar Johansson, Stockholm (SE); Mikael Ögren, Södertälje (SE); Fredrik Swartling, Stockholm (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/409,057

(22) PCT Filed: May 28, 2013

(86) PCT No.: PCT/SE2013/050607
§ 371 (c)(1),
(2) Date: Dec. 18, 2014

(87) PCT Pub. No.: WO2013/191614
PCT Pub. Date: Dec. 27, 2013

(65) Prior Publication Data
US 2015/0191170 A1    Jul. 9, 2015

(30) Foreign Application Priority Data
Jun. 19, 2012 (SE) ..................... 1250644

(51) Int. Cl.
*B60T 8/24* (2006.01)
*B60W 30/14* (2006.01)
(Continued)

(52) U.S. Cl.
CPC ............ *B60W 30/146* (2013.01); *B60K 31/00* (2013.01); *B60T 1/062* (2013.01); *B60T 7/12* (2013.01);
(Continued)

(58) Field of Classification Search
CPC ........... B60W 30/146; B60W 10/196; B60W 30/14; B60W 30/18072; B60K 31/00; B60T 1/062; B60T 7/12; B60T 7/18; B60T 10/00; G07C 5/08
See application file for complete search history.

(56) References Cited

U.S. PATENT DOCUMENTS 8,170,770 B2 *  5/2012  Grolle ................... B60W 10/06
                                              701/96
9,067,573 B2 *  6/2015  Matoy ..................... B60T 8/246
(Continued)

FOREIGN PATENT DOCUMENTS

EP    1 013 521 A2   6/2000
EP    1 288 056 A2   3/2003
(Continued)

OTHER PUBLICATIONS

William Strunk, Jr., and E.B. White, "The Elements of Style", 3rd Edition, 1979, all pages.*
(Continued)

Primary Examiner — Calvin Cheung
(74) Attorney, Agent, or Firm — Ostrolenk Faber LLP

(57) ABSTRACT

A system for governing a reference speed $v_{ref\_dhsc}$ for a downhill speed control system in a vehicle in connection with a downhill gradient. A simulation unit simulates at least one future speed profile $v_{sim}$ for an actual vehicle speed over a section of road in front of the vehicle, based on topographic information. An establishing unit establishes whether the reference speed $v_{ref\_dhsc}$ is to be allocated an increased reference speed $v_{ref\_dhsc\_schwung}$. This establishing is based on a comparison of the simulated future speed profile $v_{sim}$ with a permitted magnitude of the increased reference speed $v_{ref\_dhsc\_schwung}$ and/or with an infringement speed $v_{sl}$. An allocation unit allocates the value of the increased reference speed $v_{ref\_dhsc\_schwung}$ to the reference speed $v_{ref\_dhsc}$ if this has been established.

24 Claims, 6 Drawing Sheets

(51) Int. Cl.
  *B60K 31/00*  (2006.01)
  *B60T 7/12*  (2006.01)
  *B60T 10/00*  (2006.01)
  *G07C 5/08*  (2006.01)
  *B60T 7/18*  (2006.01)
  *B60W 30/18*  (2012.01)
  *B60T 1/06*  (2006.01)
  *G07C 5/00*  (2006.01)

(52) U.S. Cl.
  CPC .............. *B60T 7/18* (2013.01); *B60T 10/00* (2013.01); *B60W 30/18072* (2013.01); *G07C 5/08* (2013.01); *B60W 2520/10* (2013.01); *B60W 2520/105* (2013.01); *B60W 2550/143* (2013.01); *B60W 2720/10* (2013.01); *B60W 2720/106* (2013.01); *G07C 5/002* (2013.01)

(56) References Cited

U.S. PATENT DOCUMENTS

| | | | | |
|---|---|---|---|---|
| 2002/0143457 | A1* | 10/2002 | Hellmann | B60K 31/04 701/93 |
| 2005/0267665 | A1* | 12/2005 | Iwatsuki | B60T 7/12 701/70 |
| 2006/0149450 | A1* | 7/2006 | Taffin | F16H 61/0213 701/51 |
| 2008/0195289 | A1* | 8/2008 | Sokoll | B60T 7/122 701/70 |
| 2010/0217469 | A1* | 8/2010 | Bach | B60T 7/122 701/31.4 |
| 2010/0280729 | A1* | 11/2010 | Samsioe | B60T 7/22 701/93 |
| 2012/0123658 | A1* | 5/2012 | Kagawa | B60W 30/16 701/93 |
| 2014/0121889 | A1* | 5/2014 | Sodergren et al. | B60W 40/1005 701/32.9 |
| 2015/0210281 | A1* | 7/2015 | Johansson | B60W 50/0097 701/94 |

FOREIGN PATENT DOCUMENTS

| WO | WO 2008/094111 A1 | 8/2008 |
|---|---|---|
| WO | WO 2008/094113 A1 | 8/2008 |
| WO | WO 2008/094114 A1 | 8/2008 |

OTHER PUBLICATIONS

Merriam-Webster's Collegiate Dictionary, 10th Edition, 1993, all pages.*
International Search Report dated Oct. 3, 2013 issued in corresponding International patent application No. PCT/SE2013/050607.

* cited by examiner

METHOD AND DEVICE FOR CONTROLLING THE REFERENCE SPEED OF A DOWN-HILL SPEED CONTROLLER

The present application is a 35 U.S.C. §§371 National Phase conversion of PCT/SE2013/050607, filed May 28, 2013, which claims priority of Swedish Patent Application No. 1250644-0, filed Jun. 19, 2012, the contents of which are incorporated by reference herein. The PCT International Application was published in the English language.

TECHNICAL FIELD

The present invention relates to a method for governing a reference speed $v_{ref\_dhsc}$ for a downhill speed control system for a vehicle and a system for governing a reference speed $v_{ref\_dhsc}$ for a downhill speed control device.

The present invention also relates to a computer program and a computer program product that execute the method in accordance with the invention.

BACKGROUND

Motor vehicles, and especially heavy motor vehicles such as trucks and buses, are affected by gravity on downhill gradients in such a way that their speed increases. For this reason, many heavy vehicles are equipped with a downhill speed control system, which is arranged to restrict the speed of the vehicle so that it does not exceed a predetermined value.

A set speed $v_{set\_dhsc}$ for the downhill speed control system is set by the driver of the vehicle for example. Then the downhill speed control system ensures that this set speed $v_{set\_dhsc}$ is not exceeded by the control of one or more brake devices in the vehicle. This is carried out against a reference speed $v_{ref\_dhsc}$ for the downhill speed control system, in which the reference speed $v_{ref\_dhsc}$ depends on the set speed $v_{set\_dhsc}$. The reference speed $v_{ref\_dhsc}$ often corresponds to the set speed $v_{set\_dhsc}$, except for an example when ramping up the setpoint of the downhill speed control system speed to increase comfort.

Braking devices are designed to create a brake torque which acts to reduce the speed of the vehicle, for example by reducing the speed of rotation of the wheelset providing the vehicle with propulsion. The braking devices can comprise one or more auxiliary brakes, such as an engine brake, exhaust brake, electromagnetic retarder and hydraulic retarder. Auxiliary brakes are useful for moderate deceleration and for downhill cruise control. This means that the ordinary wheel brakes are not worn and overheated unnecessarily.

For example, the set speed $v_{set\_dhsc}$ can be set by the driver through some type of input, for example by pressing a button, turning a knob, activating a lever, input to a screen, activating a brake pedal, or through some other type of input familiar to experts in the field.

There are several different types of downhill speed control systems. One such type is a manual downhill speed control system, which can be utilised when no cruise control function is activated. Here the driver determines the set speed $v_{set\_dhsc}$ through some type of button input, for example using a steering wheel button, which is then used to regulate one or more auxiliary brakes, for example an exhaust brake and retarder.

Another type of downhill speed control system is an automatic downhill speed control system. Here the set speed $v_{set\_dhsc}$ is set using a brake pedal or the like, in such a way that the set speed $v_{set\_dhsc}$ is set to a value corresponding to the actual speed $v_{act}$ at which the vehicle is travelling when the brake pedal is released after having been applied.

Another type of downhill speed control system is an offset downhill speed control system. Here the set speed $v_{set\_dhsc}$ for the downhill speed control system is set as an offset to the set speed $v_{set\_cc}$ for a cruise control system in the vehicle. If the offset downhill speed control system is deployed when a set speed $v_{set\_cc}$ for a cruise control has been selected by the driver, the set speed $v_{set\_dhsc}$ for the downhill speed control system will be related to the set speed $v_{set\_cc}$ for the cruise control. In other words, the set speed $v_{set\_dhsc}$ for the downhill speed control system is the same as the set speed for the cruise control system $v_{set\_cc}$ plus an offset, $v_{set\_dhsc}=v_{set\_cc}+$ offset. For example this offset value can be between 3 km/h and 15 km/h. In other words, the function of the downhill speed control system is to prevent the speed of the vehicle exceeding a speed which is for example 3 km/h higher than the set speed $v_{set\_cc}$ for the cruise control system if the offset has been selected as 3 km/h.

BRIEF DESCRIPTION OF THE INVENTION

Generally speaking, the vehicle loses kinetic energy $W_k$ when it is braked from a higher speed to a lower speed. If the higher speed has been achieved through the effect of gravitational force, for example on or after a downhill gradient, it is positive from the point of view of fuel economy to be able to utilise this kinetic energy $W_k$ instead of losing it through braking.

However, because of other vehicles on the road, and/or speed limits the vehicle may not be permitted to freely increase its speed on downhill gradients, for example. For this reason, the function of the downhill speed control system is important to the driving of the vehicle.

When observing actual traffic, the following driver behaviours have been relatively common. Here the behaviour has been exemplified for a speed limit of 90 km/h, however, an expert in the field will appreciate that corresponding problems also occur at other speed limits.

Many drivers set the set speed vset_cc for the cruise control system to its maximum value, which can be 89 km/h for example (or 90 km/h for certain manufacturers) if the speed limit for the section of road is 90 km/h. The set speed $v_{set\_dhsc}$ for the downhill speed control system is then set somewhat above the set speed $v_{set\_cc}$ for the cruise control system. For example, it is common for the set speed vset_dhsc for the downhill speed control system to be set to the same speed as the set speed for the cruise control system vset_cc plus an offset of 3 km/h. In other words, the set speed $v_{set\_dhsc}$ for the downhill speed control system is often set to 92 km/h, for example.

Due to gravity, when the vehicle reaches a downhill gradient, it will accelerate above the set speed $v_{set\_cc}$ for the cruise control system and the vehicle will be braked at the set speed $v_{set\_dhsc}$ for the downhill speed control system if a reference speed $v_{ref\_dhsc}$ for the downhill speed control system is the same as the set speed $v_{set\_dhsc}$ for the downhill speed control system, $v_{ref\_dhsc}=v_{set\_dhsc}$ in other words at 92 km/h. Here the set speed $v_{set\_dhsc}$ is the value that the driver inputs into the downhill speed control system, while the reference speed $v_{ref\_dhsc}$ is the setpoint with which the downhill speed control system controls the braking devices in the vehicle such as service brakes and/or auxiliary brakes. In long downhill gradients the vehicle will have an actual speed $v_{act}$ of approximately 92 km/h for a relatively large portion of the downhill gradient; this also means a temporarily higher average speed for the vehicle. This is shown schematically in FIG. 1a, in which the set speed $v_{set\_dhsc}$ 101 for a downhill speed control system is 92 km/h, the set speed $v_{set\_cc}$ for the cruise control system is 89 km/h, and where the actual speed $v_{act}$ 103 rises to approximately 92 km/h and remains there for a large part of a downhill gradient in a schematic height section 104.

Heavy vehicles are often equipped with tachographs, which can be both completely electronic and partially mechanical. The tachograph continuously logs the speed of the vehicle among other things. An infringement speed $v_{sl}$ is also defined, which is known by the tachograph. This infringement speed $v_{sl}$ can be related to a maximum permitted speed for the vehicle and/or to a prevailing speed limit for an applicable section of road. If the vehicle may not be driven faster than 90 km/h, and/or the speed limit for the applicable section of road is 90 km/h, this infringement speed $v_{sl}$ may be set at 90.5 km/h for example.

Tachographs are often arranged to log an infringement for the driver if the infringement speed $v_{sl}$ has been exceeded for a predetermined infringement period $T_{sl}$. For example, the tachograph may log an infringement if the actual speed of the vehicle $v_{act}$ exceeds the infringement speed $v_{sl}$ of 90.5 km/h for a predetermined infringement period $T_{sl}$ equivalent to 60 seconds. In other words, if the downhill gradient means that the vehicle accelerates up to and is braked by the downhill speed control system at 92 km/h and then remains at that speed for over 60 seconds, the driver will have an infringement logged in the tachograph.

In several countries around the world the police can fine the driver based on such infringements logged in the tachograph. In other words, the police in these countries can demand to see the information on the tachograph and can also impose a fine based on this information.

In many vehicles, the driver will be warned before an infringement is logged for the driver. For example, the driver may be warned if there is a risk of an infringement being logged when the actual speed of the vehicle $v_{act}$ has exceeded the infringement speed $v_{sl}$ of 90.5 km/h for 45 seconds, for example. Because the driver would normally not want an infringement to be logged and thus risk a speeding fine, the natural response of the driver to this warning is to brake the vehicle. This behaviour is shown schematically in FIG. 1b, where the actual speed $v_{act}$ 103 drops sharply 105 at the bottom of the hill because the driver brakes the vehicle. In other words, this driver behaviour results in the vehicle leaving the downhill gradient at a low actual speed $v_{act}$ 103, which is not efficient from the point of view of fuel economy.

A solution to this problem could be to lower the set speed $v_{set\_dhsc}$ for the downhill speed control system, by reducing the offset, for example. However, this would lead to an unnecessary amount of the actual speed of the vehicle $v_{act}$ being braked away over the downhill gradient, which is not optimum from the point of view of fuel economy and not optimum from the point of view of driving time.

SUMMARY OF THE INVENTION

One object of the present invention is, in a controlled manner, to take advantage of the kinetic energy $W_k$ a vehicle acquires on a downhill gradient.

This objective is achieved by utilising the aforementioned method for governing a reference speed $v_{ref\_dhsc}$ for a downhill speed control system, according to the disclosure herein. The objective is also achieved by utilising the aforementioned system for governing a reference speed $v_{ref\_dhsc}$ for a downhill speed control system, according to the disclosure herein.

The objective is also achieved by the aforementioned computer program and computer program product that implement the method according to the invention.

Utilising the present invention obtains an increased reference speed $v_{ref\_dhsc\_schwung}$ for said downhill speed control system in the final part of a downhill gradient, which results in an increased actual vehicle speed at the end of the downhill gradient. This increase in actual vehicle speed means that the vehicle leaves the downhill gradient with an increased kinetic energy $W_k$, which can be utilised in the propulsion of the vehicle following the downhill gradient, for example, on an uphill gradient that starts after the downhill gradient, or so that the vehicle can be driven for a longer distance before fuel needs to be injected in order for the vehicle to maintain the set speed $v_{set\_cc}$ for the cruise control system.

According to one embodiment of the invention, establishing whether the increased reference speed $v_{ref\_dhsc\_schwung}$ shall be applied is based on one or more rules regarding speed limits and/or infringements being logged on the digital tachograph card. Being able to take advantage of the free kinetic energy $W_k$ obtained due to the acceleration of the vehicle on a downhill gradient, without risking infringements logged on the digital tachograph card and without risking warnings about the risk of an infringement being logged, means that the driver can easily maximise the increased actual vehicle speed at the end of the gradient, which maximises the utilisation of the available kinetic energy $W_k$.

According to one embodiment of the invention, governing the reference speed $v_{ref\_dhsc}$ for the downhill speed control system is coordinated with the control carried out by a reference speed $v_{ref\_cc}$ for the cruise control system propelling the vehicle in order to maximise the magnitude of the increased reference speed $v_{ref\_dhsc\_schwung}$. For example, governing the reference speed $v_{ref\_dhsc}$ for the downhill speed control system, when coordinated with a reference speed governing cruise control system such as Scania Active Prediction (Look Ahead), can utilise the knowledge that the reference speed vref_cc for the cruise control system can be reduced prior to a downhill gradient. This reduction means that the reference speed $v_{ref\_dhsc}$ for the downhill speed control system at the start of the downhill gradient can adopt the value of the set speed $v_{set\_cc}$ for the cruise control system in order to then adopt an increased reference speed $v_{ref\_dhsc}$ for the downhill speed control system. Because simulation of the future speed profile $v_{sim}$ for the future vehicle speed is based on the current position/time and is calculated on the basis of map data in front of the vehicle, governing the reference speed $v_{ref\_dhsc}$ for the downhill speed control system is very exact.

Today there is an express customer requirement that the vehicle's cruise control must be able to ensure that the same vehicle speed that can be maintained on the flat can also be maintained on long downhill gradients. As reference speed governing cruise control systems, such as Scania Active Prediction, which reduce the reference speed $v_{ref\_cc}$ prior to downhill gradients, come onto the market, it is highly probable that these will create a greater time window to the vehicle in front on downhill gradients due to speed reductions prior to the downhill gradient. It is also probable that a vehicle with Scania Active Prediction, or the like, can utilise a temporarily higher final speed following the downhill gradient, to reduce the time window to the vehicle in front in a more fuel efficient manner. However, this assumes that the vehicle in front maintains a constant speed of approximately 90 km/h.

BRIEF DESCRIPTION OF DRAWINGS

The invention will be illuminated in more detail below on the basis of the enclosed figures, in which the same references are used for the same components, and where.

DESCRIPTION OF PREFERRED EMBODIMENTS

Figure 2A:
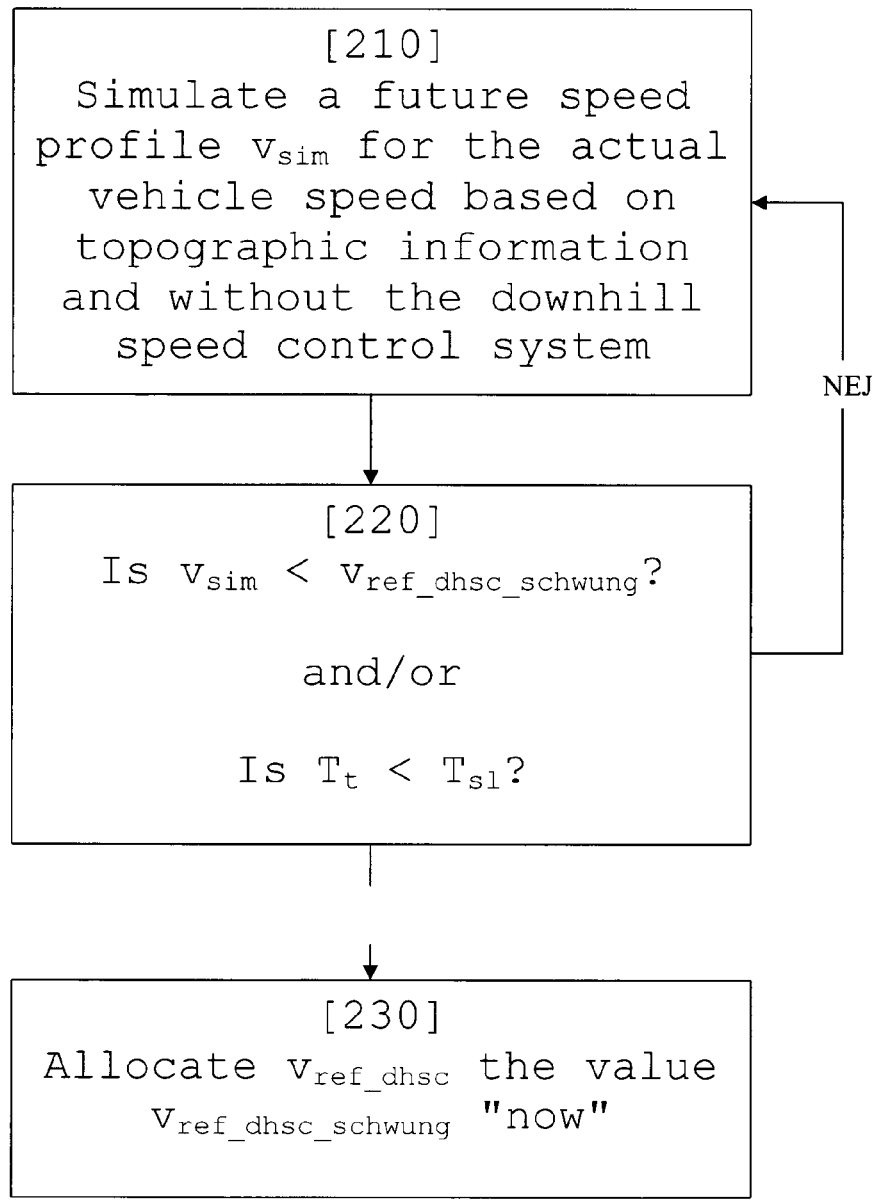
FIGS. 2a and 2b show two flow diagrams for different embodiments of the method according to the invention, FIG. 3 schematically shows the principle of one embodiment of the invention in one driving situation, FIG. 4 schematically shows the principle of one embodiment of the invention in one driving situation, FIG. 5 schematically shows the principle of one embodiment of the invention in one driving situation, FIG. 6 schematically shows the principle of one embodiment of the invention in one driving situation, FIG. 7 schematically shows the principle of one embodiment of the invention in one driving situation, and FIG. 8 schematically shows a control unit according to the invention.

The present invention relates to governing a reference speed $v_{ref\_dhsc}$ for a downhill speed control system in a vehicle in connection with a downhill gradient, which results in an increased reference speed $v_{ref\_dhsc\_schwung}$ in the final part of the gradient. FIG. 2a shows a schematic flow diagram for the invention.

In a first step 210 for the method of the present invention, at least one future speed profile $v_{sim}$ of the vehicle is simulated for a section of road in front of the vehicle. Here the section of road can correspond to a horizon, which is equivalent to a section of road of for example 1-2 km in front of the vehicle in its direction of travel. The simulation is carried out on the basis of topographic information, which can consist of topographic mapping information combined with positioning information for example.

According to one embodiment of the invention, the simulation can also be based on ignoring the effect of the downhill speed control system, that is to say the simulation is carried out without taking the downhill speed control system into account. In other words, the simulated speed profile $v_{sim}$ will not have an upper limit that the downhill speed control system would have applied to the simulated speed profile $v_{sim}$. Thus, for this embodiment, the simulated speed profile $v_{sim}$ will not be braked to the reference speed $v_{ref\_dhsc}$ on long downhill gradients.

A second step 220 of the method establishes whether the simulated speed profile $v_{sim}$ exceeds the increased reference speed $v_{ref\_dhsc\_schwung}$ without the effect of the downhill speed control system, or if the infringement time $T_t$ during which the future speed $v_{sim}$ exceeds an infringement speed $v_{sl}$ is too long, that is to say if the infringement time $T_t$ when $v_{sim}$ exceeds $v_{sl}$ is greater than an infringement period $T_{sl}$. If the simulated speed profile $v_{sim}$ is equal to or greater than the increased reference speed $v_{ref\_dhsc\_schwung}$, the process reverts to the first step 210. If the simulated speed profile $v_{sim}$ is less than the increased reference speed $v_{ref\_dhsc\_schwung}$, the process continues to the third step 230. This comparison of the simulated speed profile $v_{sim}$ and the increased reference speed here and in this document refers to the simulated speed profile $v_{sim}$ remaining less than the increased reference speed $v_{ref\_dhsc\_schwung}$ throughout the entire section of road. This can also be seen as meaning that a maximum value for the simulated speed profile $v_{sim}$ shall be less than the increased reference speed $v_{ref\_dhsc\_schwung}$.

If the infringement time $T_t$ is greater than or equal to the infringement period $T_{sl}$ the process reverts to the first step 210. If the infringement time $T_t$ is less than the infringement period $T_{sl}$, the process continues to the third step 230. According to one embodiment the establishment utilises a combination of these comparisons in order to determine whether the process proceeds to the third step 230. This method means evaluating whether the excess speed $v_{schwung}$ at the current point in time "now" is permitted or not. If it is not permitted, the reference speed $v_{ref\_dhsc}$ is not changed, but when the rules are fulfilled and the excess speed $v_{schwung}$ is permitted, the reference speed $v_{ref\_dhsc}$ is set to an increased value $v_{ref\_dhsc\_schwung}$.

The excess speed $v_{schwung}$ can correspond to a value of how much the increased reference speed $v_{ref\_dhsc\_schwung}$ exceeds a level that, in the final part of the downhill gradient, the reference speed $v_{ref\_dhsc}$ would have had, had the increased reference speed $v_{ref\_dhsc\_schwung}$ not been applied by the system, that is, if the system had been implemented without utilising the increased reference speed $v_{ref\_dhsc\_schwung}$.

According to one embodiment of the invention, the excess speed $v_{schwung}$ and/or the increased reference speed $v_{ref\_dhsc\_schwung}$ are predetermined by the system, and according to another embodiment the excess speed $v_{schwung}$ and/or the increased reference speed $v_{ref\_dhsc\_schwung}$ are selected by the driver.

In a third step 230 of the method of the invention, the reference speed $v_{ref\_dhsc}$ is allocated the increased value $v_{ref\_dhsc\_schwung}$. This allocation takes place "now", which essentially means at the point in time when it has been ascertained in the second step that it is appropriate to use the increased reference speed $v_{ref\_dhsc\_schwung}$. The concept "now" corresponds to a period of time that comprises the time it takes to carry out the simulation, adoption and increase.

Figure 1A:
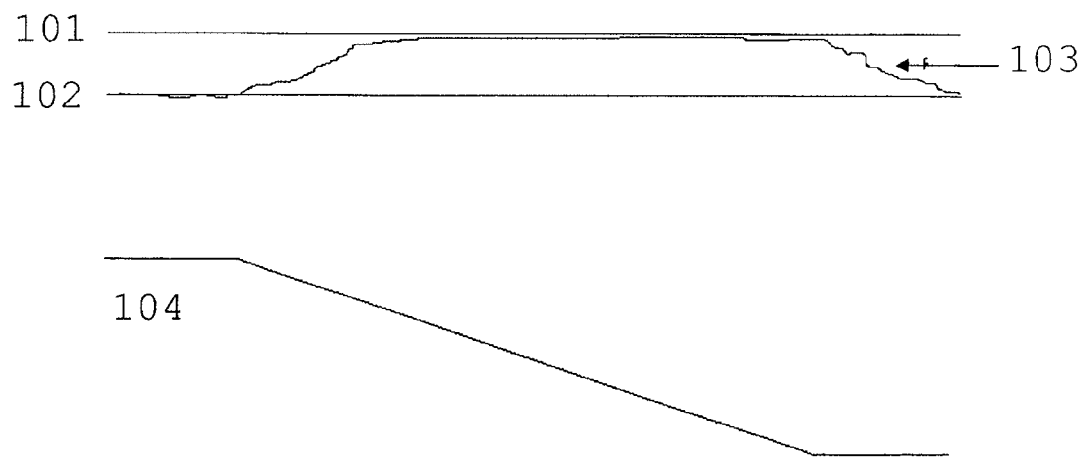
FIGS. 1a and 1b show examples of speed profiles using prior art.
Figure 1B:
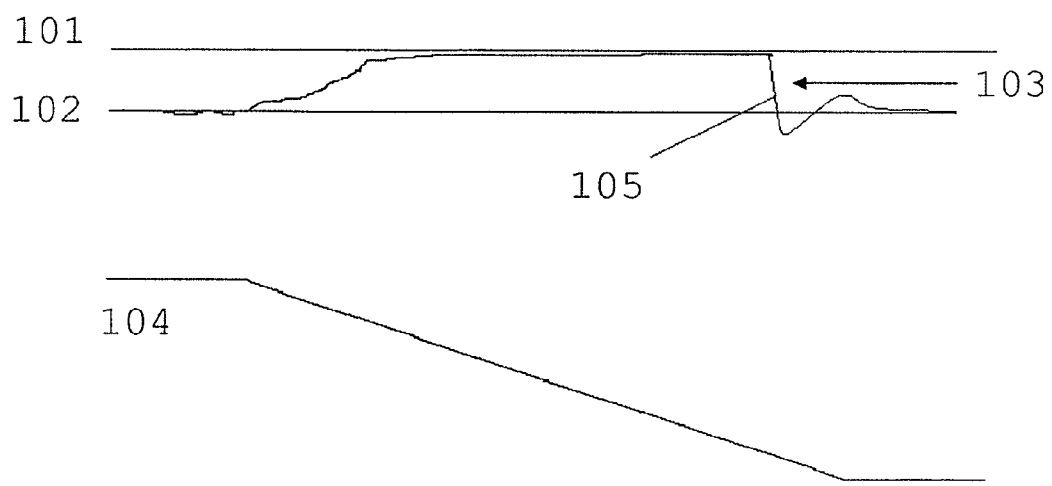

In other words, carrying out the steps of the method of the invention gives an increased reference speed $v_{ref\_dhsc\_schwung}$ on the final part of the downhill gradient, which can have a level at which an excess speed $v_{schwung}$ exceeds an initial level $v_{ref\_dhsc\_initial}$ for the reference speed during the initial part of the downhill gradient. Because of this, the vehicle will exit the downhill gradient with an increased kinetic energy $W_k$ compared with previously known solutions. Vehicles utilising previously known solutions often exit the gradient after the vehicle has been braked towards the end of the gradient as illustrated in FIG. 1b.

The increased kinetic energy $W_k$ that according to the invention can be obtained by the vehicle at the end of the gradient, can, through intelligent cruise control by a cruise control system or driver, be utilised in the section of road following the downhill gradient in order to reduce the fuel consumption of the vehicle. In addition, driving the vehicle like this makes it much easier for the driver and surrounding traffic to intuitively understand and assimilate, which increases the degree to which the systems are utilised, and at the same time reduces the amount of braking-related irritation in traffic in general.

The topographic information that according to the invention is utilised to establish one or more simulated speed profiles $v_{sim}$ can, for example, be obtained using positioning information, such as GPS information (Global Positioning System information) or similar positioning systems, mapping information and/or topographic mapping information. Positioning information can indicate where the vehicle is and mapping information and/or topographic mapping information can then be utilised to establish whether the vehicle is heading towards a downhill gradient for example.

Figure 3:
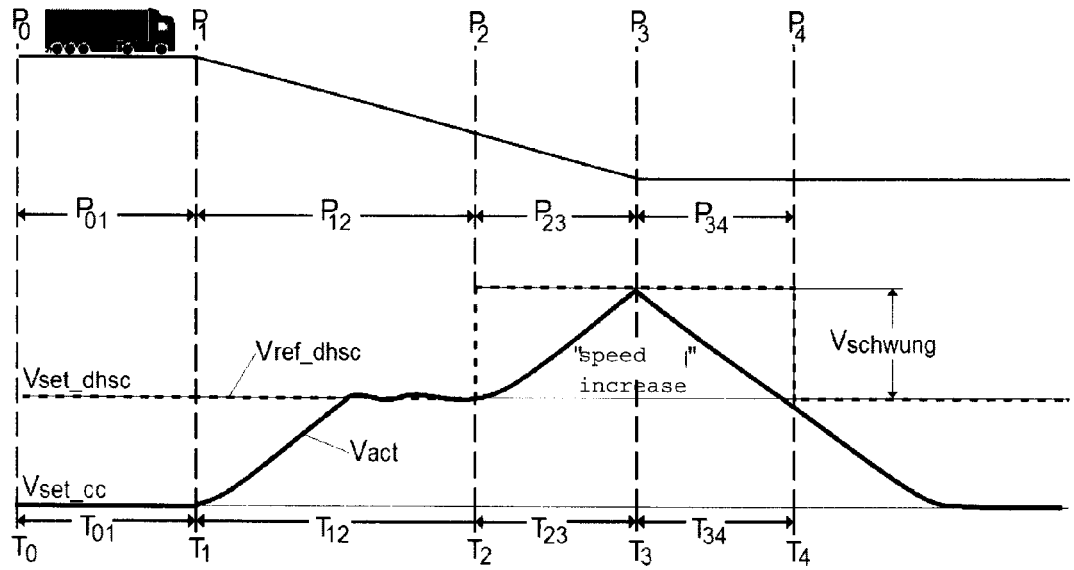

FIG. 3 shows a non-limiting example of a driving situation corresponding to the method described in FIG. 2a. The driving situation starts at a start time $T_0$ at a start position $P_0$ where topography, that is to say a contour, for a section of road on which the vehicle is located, is shown at the top of the figure. Here the section of road comprises a downhill gradient. Below the contour a level for the set speed $v_{set\_cc}$ for the cruise control system is shown (solid line at a constant level for the example) and a level for the set speed $v_{set\_dhsc}$ for the downhill speed control system (solid line at a constant level for the example). In addition, it shows how the reference speed $v_{ref\_dhsc}$ for the downhill speed control system (dashed line at a varying level for the example) can vary in relation to the set speed $v_{set\_dhsc}$ for the downhill speed control system. The actual speed $v_{act}$ of the vehicle is also shown in the Figure, indicating that because of the weight of the vehicle, the actual vehicle speed $v_{act}$ (solid thick line) starts to increase from a level corresponding to the set speed $v_{set\_cc}$ for the cruise control system when the vehicle starts rolling down the downhill gradient from an initial position $P_1$ at an initial point in time $T_1$. The corresponding solid, dashed and thick lines are also used in FIGS. 4-7 in order to illustrate the set speed $v_{set\_cc}$ for the cruise control system, the set speed $v_{set\_dhsc}$ for the downhill speed control system, the reference speed $v_{ref\_dhsc}$ for the downhill speed control system, and the actual vehicle speed $v_{act}$.

In order to describe the behaviour of the vehicle on the downhill gradient in FIG. 3, the downhill gradient has been divided up into four periods of time $T_{01}$, $T_{12}$, $T_{23}$, $T_{34}$. These time periods are also contained in and utilised in the descriptive driving situations in the other figures, which are described below. As experts will appreciate, the points of time and time periods in these figures correspond to the corresponding positions and distances on the section of road on which the vehicle is travelling. This document alternately uses points of time and positions along with periods of time and distances to explain the invention. It should therefore be appreciated that points of time and periods of time, as well as positions and distances, respectively constitute different units used to describe one and the same sequence of events according to the invention.

The start time period $T_{01}$, corresponding to the start distance $P_{01}$, extends from a start time $T_0$, corresponding to a start position $P_0$, to an initial point in time $T_1$, corresponding to an initial position $P_1$. In other words, the start time period $T_{01}$ constitutes a start distance $P_{01}$ prior to the downhill gradient.

The initial time period $T_{12}$, corresponding to the initial section $P_{12}$, extends from an initial point in time $T_1$, corresponding to an initial position $P_1$, to a second point in time $T_2$, corresponding to a second position $P_2$. In other words, the initial time period $T_{12}$ consists of the initial part $P_{12}$ of the downhill gradient.

The second time period $T_{23}$, corresponding to the second section $P_{23}$, extends from a second point in time $T_2$, corresponding to a second position $P_2$, to a third point in time $T_3$, corresponding to a third position $P_3$ at the end of the downhill gradient. In other words, the second time period $T_{23}$ here consists of the final section $P_{23}$ of the downhill gradient.

The third time period $T_{34}$, corresponding to the third section $P_{34}$, extends from the third point in time $T_3$, corresponding to the third position $P_3$, to a fourth point in time $T_4$, corresponding to a fourth position $P_4$ which is located on a flat section of road after the end of the downhill gradient. In other words, here the third time period $T_{34}$ corresponds to a section of road $P_{34}$ following the end of the downhill gradient.

In FIG. 3 the set speed $v_{set\_dhsc}$ for the downhill speed control system is set to a relatively low value, which is relatively close to the set speed $v_{set\_cc}$ for the cruise control system. This can, for example, be because the driver here entered a relatively small difference between the set speed $v_{set\_dhsc}$ for the downhill speed control system and the set speed $v_{set\_cc}$. This can, for example, also be because an offset that relates the set speed $v_{set\_dhsc}$ for the downhill speed control system to the set speed $v_{set\_cc}$ for the cruise control system is relatively small. For example the set speed $v_{set\_dhsc}$ for the downhill speed control system can be less than or equal to the infringement speed $v_{sl}$.

When the vehicle in the first point in time $T_1$ reaches the downhill gradient, the actual speed of the vehicle $v_{act}$ increases due to the weight of the vehicle from a level corresponding to the set speed $v_{set\_cc}$ for the cruise control system.

In the example shown on FIG. 3 the reference speed $v_{ref\_dhsc}$ for the downhill speed control system is equal to the set speed $v_{set\_dhsc}$ for the downhill speed control system during the initial time period $T_{12}$ in the initial section $P_{12}$ of the downhill gradient. Because of this, the actual vehicle speed $v_{act}$ is braked at the level of the reference speed $v_{ref\_dhsc}$ for the downhill speed control system, in other words here for the initial time period $T_{12}$ $v_{ref\_dhsc} = v_{ref\_dhsc\_initial} = v_{set\_dhsc}$.

According to the embodiment of the present invention exemplified in FIG. 3, an increased reference speed $v_{ref\_dhsc\_schwung} = v_{set\_dhsc} + v_{schwung} = v_{ref\_dhsc\_initial} + v_{schwung}$ is permitted on the final section of the downhill gradient $P_{23}$ and the section of road $P_{34}$ following the downhill gradient, starting at the second position $P_2$ at the second point in time $T_2$, and ending at a fourth position $P_4$ at a fourth point in time $T_4$ when the actual vehicle speed $v_{act}$ once again drops below the set speed $v_{set\_dhsc}$ for the downhill speed control system, which results in a variation of the reference speed of the downhill speed control system $v_{ref\_dhsc}$ according to Table 1 below. At the fourth point in time $T_4$, when the actual vehicle speed $v_{act}$ is less than the set speed $v_{set\_dhsc}$ for the downhill speed control system, the reference speed of the downhill speed control system $v_{ref\_dhsc}$ reverts to the set value, $v_{ref\_dhsc} = v_{set\_dhsc}$.

TABLE 1

| Time period/ distance | $T_{01}/P_{01}$ | $T_{12}/P_{12}$ | $T_{23}/P_{23}$ | $T_{34}/P_{34}$ |
|---|---|---|---|---|
| $v_{ref\_dhsc}$ | $v_{set\_dhsc}$ | $v_{set\_dhsc}$ | $v_{ref\_dhsc\_schwung} =$ $v_{ref\_dhsc\_initial} +$ $v_{schwung} =$ $v_{set\_dhsc} + v_{schwung}$ | $v_{ref\_dhsc\_schwung} =$ $v_{ref\_dhsc\_initial} +$ $v_{schwung} =$ $v_{set\_dhsc} + v_{schwung}$ |

This format of the downhill speed control system reference speed $v_{ref\_dhsc}$ results in the format of the actual vehicle speed $v_{act}$ shown in FIG. 3. In other words, the actual vehicle speed $v_{act}$ peaks at the third point in time $T_3$ at the end of the downhill gradient $P_3$, where this peak reaches almost up to the increased reference speed $v_{ref\_dhsc\_schwung} = v_{ref\_dhsc\_initial} + v_{schwung}$ for the downhill speed control system at the third point in time $T_3$. After that, the actual vehicle speed $v_{act}$ drops towards the set speed $v_{set\_cc}$ for the cruise control system. Because of this, the vehicle with the excess speed $v_{schwung}$ has an increased actual speed at the end of the gradient $P_3$, compared with the set speed $v_{set\_dhsc}$ for the downhill speed control system, which results in a shorter driving time at the same time as fuel is saved.

As described above, according to the present invention, the second point in time $T_2$ is established when the reference speed of the downhill speed control system $v_{ref\_dhsc}$ is to be given its increased value $v_{ref\_dhsc\_schwung} = v_{ref\_dhsc\_initial} + v_{schwung}$ based at least on one simulation of at least one future speed profile $v_{sim}$ for the vehicle, where at least one future speed profile $v_{vim}$ is simulated on the basis of topographic information. According to one embodiment, the simulation can also be based on ignoring the effect that the downhill speed control system would have had on the speed. The establishment of the point in time $T_2$ is carried out in such a way that the system at every point in time evaluates whether the reference speed can be allocated its increased value $v_{ref\_dhsc\_schwung}$ at this point in time, and if possible, the increased value $v_{ref\_dhsc\_schwung}$ is essentially allocated at this point in time. In other words, the system looks ahead using the simulation of the future speed profile $v_{sim}$ in order to establish whether the increase is appropriate "now", that is to say in direct connection with the point in time of the simulation and establishment. The figures designate the point in time at which it is established that an increase is appropriate as the second point in time $T_2$ or the second position $P_2$.

Establishing whether the allocation of the increased value $v_{ref\_dhsc\_schwung}$ to the reference speed is appropriate, which can be said to correspond to an establishment of the second point in time $T_2$ in the illustrations in this application, is carried out on the basis of comparisons of the future speed profile $v_{sim}$ with the infringement speed $v_{sl}$ and/or the magnitude of the increased reference value $v_{ref\_dhsc\_schwung}$, which will be described in more detail below.

Using the present invention, the increased reference speed $v_{ref\_dhsc\_schwung}$ can be applied so that an excess speed $v_{schwung}$, and consequently the actual speed $v_{act}$, of the vehicle at the end of the gradient can be maximised, benefiting both driving time and fuel consumption.

Figure 2B:
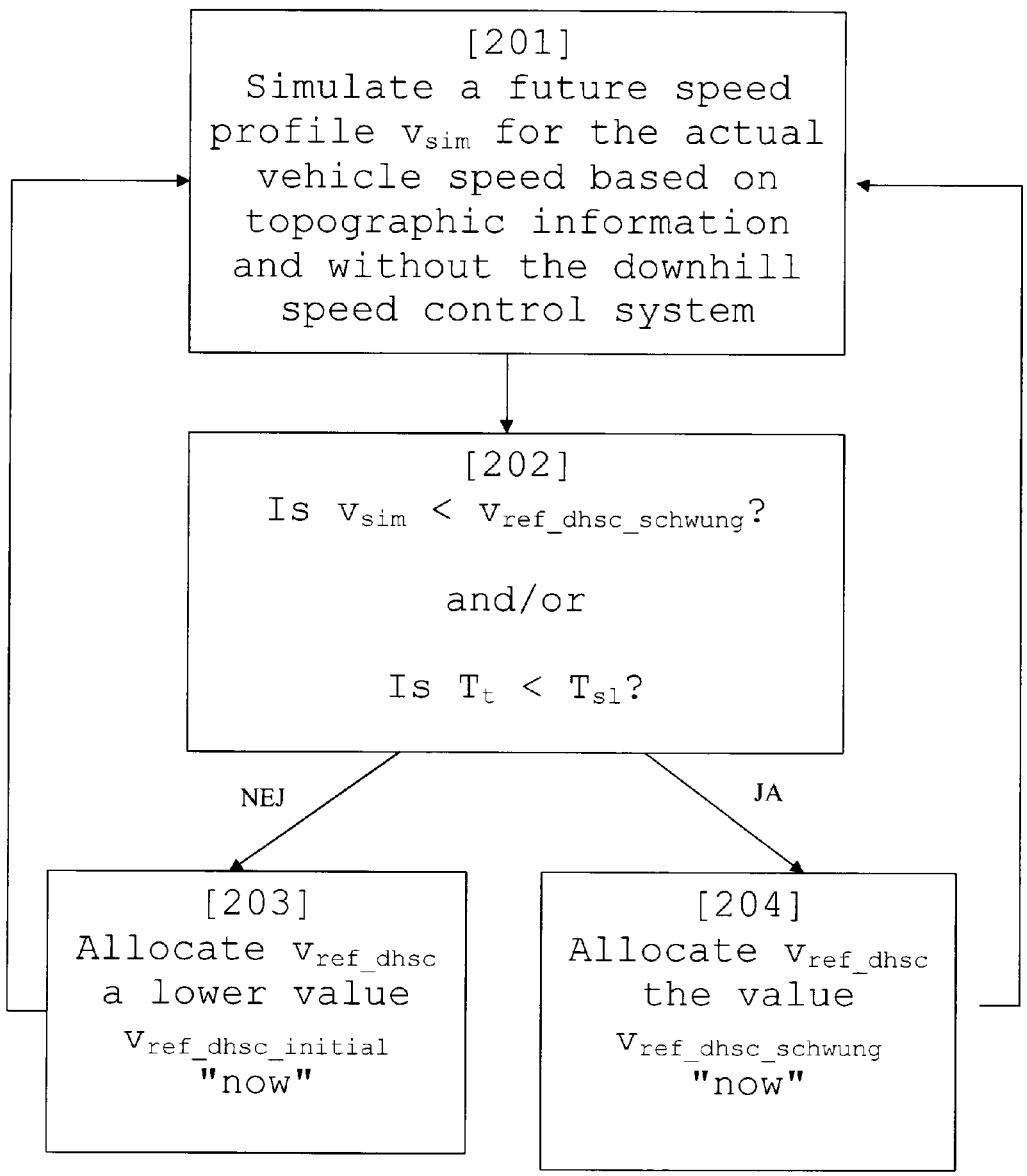

FIG. 2b shows a flow diagram for one embodiment of the invention, with four steps 201, 202, 203, 204.

Figure 4:
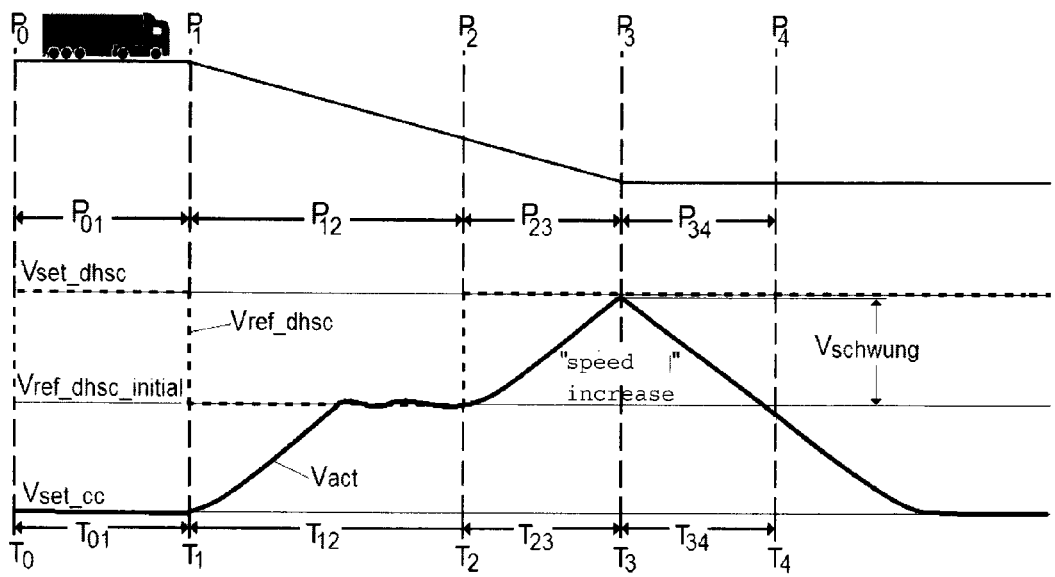

FIG. 4 shows a non-limiting example of a driving situation corresponding to that in FIG. 3 and in which the embodiment according to the flow diagram in FIG. 2b is illustrated. For the sake of clarity, the driving situation in FIG. 4 has been divided up into four periods of time similarly to FIG. 3.

In a first step 201 for the method of the present embodiment, at least one future speed profile $v_{sim}$ of the vehicle is simulated for a section of road in front of the vehicle. The simulation is carried out as described above, that is to say at least based on topographic information.

A second step 202 of the method establishes whether the simulated speed profile $v_{sim}$ is less than the increased reference speed $v_{ref\_dhsc\_schwung}$ without the effect of the downhill speed control system, or if the infringement time $T_t$ during which the future speed $v_{sim}$ exceeds an infringement speed $v_{sl}$ is too long, that is to say, if the infringement time $T_t$ when $v_{sim}$ exceeds $v_{sl}$ is shorter than the infringement period $T_{sl}$. If the simulated speed profile $v_{sim}$ is greater than or equal to the increased reference speed $v_{ref\_dhsc\_schwung}$ and/or if the infringement time $T_t$ is longer than or equal to the infringement period $T_{sl}$ the process progresses to the third step 203. In the third step 203 the reference speed $v_{ref\_dhsc}$ is allocated a lower initial value $v_{ref\_dhsc\_initial}$. This allocation takes place in FIG. 4 at the initial point in time $T_1$, which is described in more detail below.

If the simulated speed profile $v_{sim}$ is less than the increased reference speed $v_{ref\_dhsc\_schwung}$ and/or if the infringement time $T_t$ is shorter than the infringement period $T_{sl}$, the process progresses to the fourth step 204.

In the fourth step 204, the reference speed $v_{ref\_dhsc}$ is allocated the increased value $v_{ref\_dhsc\_schwung}$. This allocation takes place in FIG. 4 at the second point in time $T_2$, which is described in more detail below.

In the example shown in FIG. 4, the reference speed of the downhill speed control system $v_{ref\_dhsc}$ during the start time period $T_{01}$ has a level corresponding to the level of the set speed for the downhill speed control system, $v_{ref\_dhsc} = v_{set\_dhsc}$. The reference speed of the downhill speed control system $v_{ref\_dhsc}$ is then lowered by the downhill speed control system at the first point in time $T_1$ at the start of the downhill gradient $P_1$ to an initial level $v_{ref\_dhsc\_initial}$, which is lower than the level of the set speed $v_{set\_dhsc}$ for the downhill speed control system, and retains this initial level $v_{ref\_dhsc\_initial}$ during a first time period $T_{12}$ in the initial section $P_{12}$ of the downhill gradient. In other words, the three initial steps according to FIG. 2b are carried out here in connection with the first point in time $T_1$.

Because of this, the actual vehicle speed $v_{act}$ is braked at the reduced level $v_{ref\_dhsc\_initial}$ for the reference speed $v_{ref\_dhsc}$ for the downhill speed control system. One objective in allowing a reduction of the reference speed to an initial level $v_{ref\_dhsc\_initial}$, which is lower than the set speed $v_{set\_dhsc}$ for the downhill speed control system, is to provide, at the end of the downhill gradient, exactly the set speed $v_{set\_dhsc}$ selected by the driver without getting warnings and/or infringements for speeding. Another objective of this is to allow the adjustment of the infringement time $T_t$ by which the future simulated speed profile exceeds the infringement speed.

With previously known systems, it has been possible to reduce the reference speed of the downhill speed control system at the first point in time $T_1$ at the start of the downhill gradient $P_1$ to an initial reduced level $v_{ref\_dhsc\_initial}$ in order to then be maintained at this initial level $v_{ref\_dhsc\_initial}$ throughout the entire downhill gradient so that the driver does not risk a speeding infringement.

Instead, according to the present invention, an increased reference speed $v_{ref\_dhsc\_schwung}$ is allowed for the second time period $T_{23}$ in the final section of the downhill gradient $P_{23}$, because the simulated future speed $v_{sim}$ at the second point in time $T_2$ meets the conditions in the second step 220 in the method described in FIG. 2a. This increased reference speed $v_{ref\_dhsc\_schwung}$, which is equal to the set speed $v_{set\_dhsc}$ for the downhill speed control system, is then maintained in the third time period $T_{34}$ and afterwards.

In other words, the reference speed $v_{ref\_dhsc}$ for the downhill speed control system varies according to Table 2 for the various time periods for the section of road in FIG. 4 if the present embodiment of the invention is utilised.

TABLE 2

| Time period/ distance | $T_{01}/P_{01}$ | $T_{12}/P_{12}$ | $T_{23}/P_{23}$ | $T_{34}/P_{34}$ |
|---|---|---|---|---|
| $V_{ref\_dhsc}$ | $V_{set\_dhsc}$ | $V_{ref\_dhsc\_initial}$, where $V_{ref\_dhsc\_initial} \leq V_{set\_dhsc}$ | $V_{ref\_dhsc\_schwung} = V_{ref\_dhsc\_initial} + V_{schwung} = V_{set\_dhsc}$ | $V_{ref\_dhsc\_schwung} = V_{ref\_dhsc\_initial} + V_{schwung} = V_{set\_dhsc}$ |

As illustrated in FIG. 4, this format of the downhill speed control system reference speed $V_{ref\_dhsc}$ results in the actual vehicle speed $v_{act}$ peaking at the third point in time $T_3$ at the end of the downhill gradient. In other words the actual vehicle speed $v_{act}$ is allowed to increase after the second point in time $T_2$ until the actual vehicle speed $v_{act}$ reaches just under the increased reference speed $V_{ref\_dhsc\_schwung}$ for the downhill speed control system at the third point in time $T_3$, after which the actual vehicle speed $v_{act}$ drops towards the set speed $v_{set\_cc}$ for the cruise control system. This gives the vehicle an increased actual speed at the end of the gradient $P_3$, which is increased by an excess speed $v_{schwung}$, because the increased reference speed $V_{ref\_dhsc\_schwung}$ for the downhill speed control system is increased by this excess speed $v_{schwung}$ compared with the initial reference speed $V_{ref\_dhsc\_initial}$, $V_{ref\_dhsc\_schwung} = V_{ref\_dhsc\_initial} + V_{schwung}$. This saves fuel because the kinetic energy $W_k$ of the vehicle, which has been built up by gravity, can be utilised to propel the vehicle after the downhill gradient.

In order for the increased actual speed to give the correct format, that is to say a size and position in time/space that means that the kinetic energy of the vehicle can be utilised to the maximum, the second point in time $T_2$ needs to be established. In other words the system must establish when the reference speed $V_{ref\_dhsc}$ for the downhill speed control system should be allocated its increased value $V_{ref\_dhsc\_schwung}$ in order to optimally utilise the contribution from gravity, which also optimises fuel consumption and driving time. According to the invention, this is carried out by the system evaluating, for different points in time, whether it would be appropriate to give the reference speed $V_{ref\_dhsc}$ an increased value $V_{ref\_dhsc\_schwung}$ at each of these points in time. If this is deemed appropriate at one point in time, which in this document is exemplified by the second point in time $T_2$, the reference speed $V_{ref\_dhsc}$ is allocated the increased value $V_{ref\_dhsc\_schwung}$ at this point in time.

According to the present invention, the second point in time $T_2$ is established on the basis of at least one simulation of at least one future speed profile $v_{sim}$ for the vehicle, in other words, based on an estimation of the future format of the actual speed $v_{act}$ for the section of road. The at least one simulated speed profile $v_{sim}$ is simulated according to the invention on the basis of topographic information. According to one embodiment of the invention, the simulation is also carried out on the basis of ignoring the downhill speed control system.

Then it is established when, in other words at which second point in time $T_2$, the excess speed $v_{schwung}$ is to be added to the downhill speed control system reference speed $V_{ref\_dhsc}$ in order to give the reference speed an increased value $V_{ref\_dhsc\_schwung}$, where this increased reference value gives an increased actual speed at the end of the gradient $P_3$ that reaches this increased value for the downhill speed control system reference speed $V_{ref\_dhsc\_schwung}$. This establishment depends on the magnitude of the excess speed $v_{schwung}$ by which the initial reference speed $V_{ref\_dhsc\_initial}$ is increased to obtain its increased value $V_{ref\_dhsc\_schwung}$ and/or on the simulated speed profile relative to the infringement speed $v_{sl}$.

According to one embodiment of the invention, after the downhill gradient in FIGS. 3 and 4, when the actual vehicle speed $v_{act}$ is less than $v_{set\_dhsc}$ again the reference speed $V_{ref\_dhsc}$ is given its normal level, that is to say the set speed $V_{set\_dhsc}$. In addition, a braking margin can be utilised here in order to obtain a bumpless transition, that is to say that unwanted temporary downhill speed control can be prevented when changing the value of the reference speed $V_{ref\_dhsc}$ for the downhill speed control system.

Figure 5:
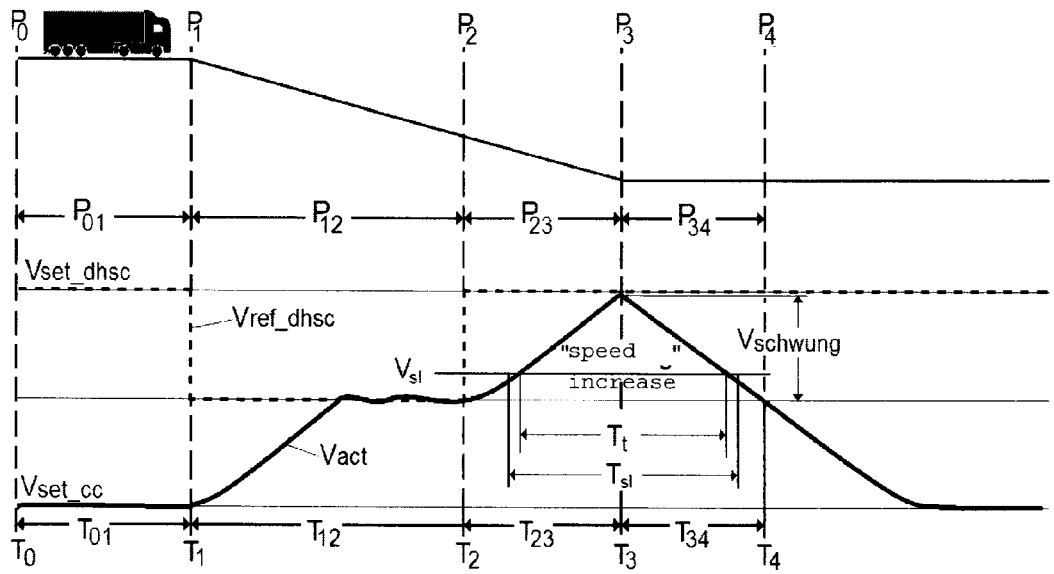

FIG. 5 illustrates how the point in time at which the reference speed $V_{ref\_dhsc}$ is to be given the increased value $V_{ref\_dhsc\_schwung}$, that is to say the second point in time $T_2$, according to one embodiment can be established as a value on the basis of one or more rules for giving infringements, where these infringements are related to speed violations. The method described here follows the method described in FIGS. 2a and/or 2b.

According to one rule for giving infringements, one infringement is added to a digital tachograph card in the vehicle if the vehicle speed $v_{act}$ is established to have exceeded the infringement speed $v_{sl}$ for a period longer than the predetermined infringement period $T_{sl}$. In other words here the driver will be given an infringement if the actual vehicle speed $v_{act}$ exceeds the infringement speed for longer than the infringement period $T_{sl}$.

FIG. 5 shows a non-limiting example of a driving situation with topography corresponding to FIG. 3, that is to say comprising a downhill gradient. The information presented in FIG. 5 comprises the information presented in FIG. 3, but with an illustration of how the system works out that the reference speed $V_{ref\_dhsc}$ is to be given the increased value $V_{ref\_dhsc\_schwung}$ at the second point in time $T_2$.

According to the embodiment, the second point in time $T_2$ is established on the basis of one or more simulations of the future vehicle speed $v_{sim}$, by establishing the length of any infringement time $T_t$. Here the infringement time $T_t$ corresponds to the time that the simulation of future vehicle speed $v_{sim}$ is calculated to exceed an infringement speed $v_{sl}$ in connection with said downhill gradient, more particularly during the second $T_{23}$ and third $T_{34}$ time periods in this example. Here the simulated infringement time $T_t$ is compared with the infringement period $T_{sl}$ which constitutes the time limit at which a warning and/or speeding infringement is given.

If the infringement time $T_t$ is less than the infringement period $T_{sl}$, $T_t < T_{sl}$, as shown in FIG. 5, a temporary excess speed is acceptable and the reference speed $V_{ref\_dhsc}$ is given the increased value $V_{ref\_dhsc\_schwung}$ at the second point in time.

If instead the infringement time $T_t$ is greater than or equal to the infringement period $T_{sl}$, $T_t \geq T_{sl}$, a temporary excess speed $v_{schwung}$ is not acceptable and a new simulation is carried out at a later point in time, for example in the order of magnitude of 1 second or 20 meters after the previous simulation. In other words a new simulation is carried out, and if, for example, the vehicle is approaching the end of the downhill gradient and the new infringement time $T_t$ for the new simulation is less than the previous infringement time $T_t$ the comparison of the new infringement time with the infringement period $T_{sl}$ can result in the reference speed $V_{ref\_dhsc}$ being given the increased value $V_{ref\_dhsc\_schwung}$ when the new simulation was carried out.

In other words, according to this embodiment, the second point in time $T_2$ is established as a value such that the vehicle speed $v_{act}$ is calculated to exceed the infringement speed $v_{sl}$ for a shorter time than the predetermined infringement period $T_{sl}$. Because the infringement speed $v_{sl}$ and infringement period $T_{sl}$ are known, and the future speed profile $v_{sim}$ can be simulated, $T_2$ can also be calculated based on these so that the excess speed, and thus also the kinetic energy $W_k$, can be maximised at the end of the gradient $T_3$, at the same time ensuring that no infringement is given, that is to say no infringement is logged in the digital tachograph card.

According to one embodiment of the invention, the magnitude of the temporary excess speed $v_{schwung}$ is established in such a way that the increased reference speed $v_{ref\_dhsc\_schwung}$ is essentially equal to the actual vehicle speed $v_{act}$ allowed on the basis of the simulation result of the future vehicle speed $v_{sim}$ without breaking the rules for giving infringements related to speeding violations.

According to one embodiment of the invention the driver of the vehicle is given a warning if the vehicle speed $v_{act}$ exceeds the infringement speed $v_{sl}$ for an infringement time $T_t$ longer than the infringement period $T_{sl}$.

According to one embodiment of the invention, this rule for when warnings are given can be utilised, similarly to the rule for logging infringements in the digital tachograph card is utilised, in order to establish the second point in time $T_2$ when the reference speed $v_{ref\_dhsc}$ is given its increased value $v_{ref\_dhsc\_schwung}$.

According to this embodiment, the second point in time $T_2$ is established as a value such that the simulated vehicle speed $v_{sim}$ is simulated to exceed the infringement speed $v_{sl}$ for a shorter time than the predetermined infringement period $T_{sl}$, hence no warning need be given to the driver. Because of this, the excess speed can be maximised at the end of the gradient $T_3$, at the same time ensuring that no warning is given to the driver, which means that the risk of panicky braking in the final section of the gradient, as shown in FIG. 1b, can be avoided.

According to one embodiment of the invention, the allocation of the increased reference speed $v_{ref\_dhsc\_schwung}$ to the reference speed $v_{ref\_dhsc}$ takes place if the simulated future speed profile $v_{sim}$ according to the simulation is less than the infringement speed $v_{sl}$.

This allocation can be carried out on the basis of at least one comparison at at least one point in time and the current point in time of an infringement time $T_t$, during which the simulated future speed profile $v_{sim}$ according to the simulation will exceed said infringement speed $v_{sl}$, for a predetermined infringement period $T_{sl}$. If the infringement time $T_t$ is shorter than the infringement period $T_{sl}$ the allocation takes place here.

Figure 6:
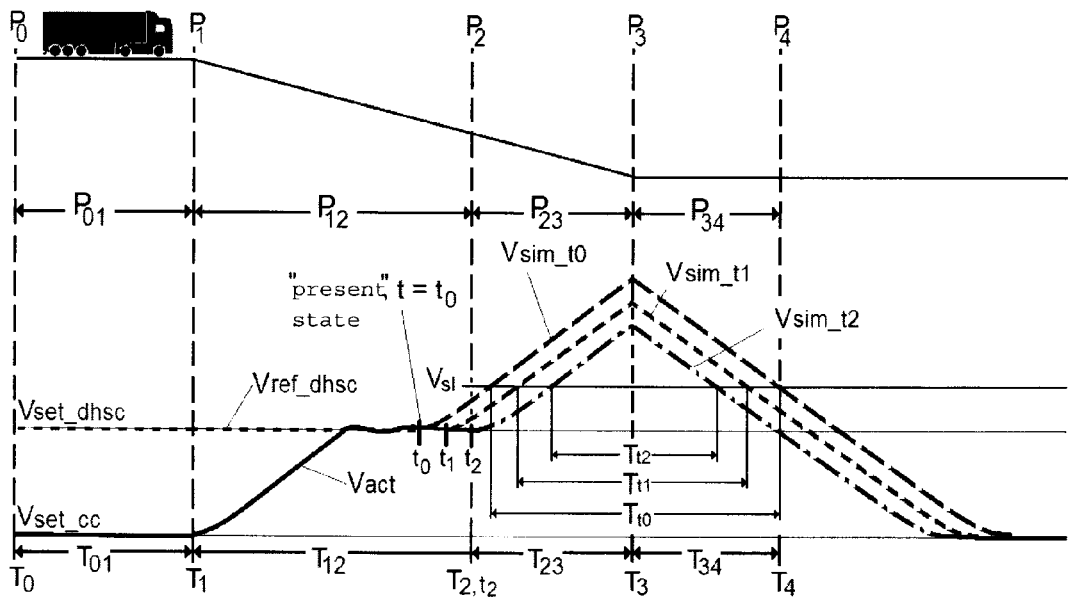

FIG. 6 illustrates a more detailed embodiment of the invention for the establishment of the point in time for allocating the increased reference speed $v_{ref\_dhsc\_schwung}$ to the reference speed $v_{ref\_dhsc}$, according to which a comparison is made of the predetermined infringement period $T_{sl}$ described above and at least one simulated infringement time $T_t$ when it is predicted that $v_{sl}$ will be exceeded. FIG. 6 shows three different infringement times $T_{t0}$, $T_{t1}$ and $T_{t2}$, which are related to three different points in time $t_0$, $t_1$ and $t_2$ respectively. Each of the infringement times $T_{t0}$, $T_{t1}$ and $T_{t2}$ are based on separate simulations of the future vehicle speed $v_{sim\_t0}$, $v_{sim\_t1}$ and $v_{sim\_t2}$, which are based on the actual vehicle speed $v_{act}$ at the three different points in time $t_0$, $t_1$ and $t_2$ respectively. This comparison can then be utilised to establish whether the reference speed $v_{ref\_dhsc}$ is to be given its increased value $v_{ref\_dhsc\_schwung}$ at any of the three different points in time $t_0$, $t_1$ and $t_2$ respectively. In other words, this comparison is utilised to establish the second point in time $T_2$, which is when the reference speed $v_{ref\_dhsc}$ is set to its increased value $v_{ref\_dhsc\_schwung}$.

According to an embodiment illustrated in FIG. 6, and which follows the flow diagram in FIG. 2a, these comparisons can be carried out in a first step 210 at a current point in time/position for the vehicle when $t=t_0$, designated "current situation" in FIG. 6, by estimating a first future speed profile $v_{sim\_t0}$ for the vehicle's journey down and after the gradient. Then, in a second step 220, a first infringement time $T_{t0}$, during which the first future speed profile $v_{sim\_t0}$ is predicted to exceed the infringement speed $v_{sl}$, is compared with the infringement period $T_{sl}$.

If the first infringement time $T_{t0}$ is shorter than the infringement period $T_{sl}$, that is to say if $T_{t0}<T_{sl}$, in a third step 230 at the current point in time/position $t_0$ reference speed $v_{ref\_dhsc}$ is set to its increased value $v_{ref\_dhsc\_schwung}$, because this increase will not result in an infringement/warning. The current point in time/position $t_0$ for the vehicle then corresponds to the second point in time $T_2$.

If, on the other hand, the first infringement time $T_{t0}$ is longer than or equal to the infringement period $T_{sl}$, that is to say if $T_{t0} \geq T_{sl}$, then no decision is made to increase the reference speed of the downhill speed control system $v_{ref\_dhsc}$ at the point in time $t=t_0$.

Instead, at point in time $t=t_1$, a further simulation is carried out of the future speed profile of the future vehicle speed $v_{sim\_t1}$ based on the new current position of the vehicle. In other words, up to the next simulation at $t=t_1$ the vehicle is driven an arbitrary appropriate time/distance from the point in time/position when $t=t_0$, where the/distance between $t_0$ and $t_1$ can be in the order of magnitude 1 second or 20 meters, for example.

At this additional current position a further future speed profile $v_{sim\_t1}$ is estimated.

Then a further infringement time $T_{t1}$, during which the further simulated speed profile $v_{sim\_t1}$ is predicted to exceed the infringement speed $v_{sl}$, is compared with the infringement period $T_{sl}$. If the comparison shows that the further infringement time $T_{t1}$ is shorter than the infringement period $T_{sl}$, $T_{t1}<T_{sl}$, the reference speed of the downhill speed control system $v_{ref\_dhsc}$ is set to the increased value $v_{ref\_dhsc\_schwung}$ from and including the point in time/position $t=t_1$ on which the further simulation $v_{sim\_t1}$ is based.

If instead the comparison shows that the further infringement time $T_{t1}$ is longer than or equal to the infringement period $T_{sl}$, $T_{t1} \geq T_{sl}$, a further future speed profile $v_{sim\_t2}$ is simulated at an additional current point in time/position $t=t_2$. At the point in time/position $t=t2$ the vehicle has been driven an arbitrary appropriate time/distance, in the order of magnitude 20 meters for example, closer to end of the gradient. At this new further point in time/position $t=t_2$ the further future speed profile $v_{sim\_t2}$ is simulated, which is utilised in order to, as described above, to compare a further infringement time $T_{t2}$ for the further simulated speed profile $v_{sim\_t2}$ with the infringement period $T_{sl}$.

If the comparison shows that the further infringement time $T_{t2}$ is shorter than the infringement period $T_{sl}$, $T_{t2}<T_{sl}$, the reference speed of the downhill speed control system $v_{ref\_dhsc}$ is set to the increased value $v_{ref\_dhsc\_schwung}$ from and including the point in time/position $t=t2$ on which the further simulation $v_{sim\_t2}$ is based. In other words the second point in time $T_2$ corresponds to the further point in time $t_2$, $T_2=t_2$. In the example shown in FIG. 6 this is the case, clarified by designating $T_2$ in FIG. 6 as $T_{2,t2}$. Had the outcome instead been $T_{t2} \geq T_{sl}$ the algorithm had carried on in the same way until the second point in time $T_2$ could be established as a later "current" position. In other words $T_{2,t2}$ in FIG. 6 indicates the point in time when the reference speed $v_{ref\_dhsc}$ is set to the increased value $v_{ref\_dhsc\_schwung}$, which is when the further simulation $v_{sim\_t2}$ meets the requirements of the second step 220 in FIG. 2a.

This embodiment describes an efficient calculation method for establishing when the reference speed $v_{ref\_dhsc}$ is to be given its increased value $v_{ref\_dhsc\_schwung}$, which contributes little to the complexity in the system. In addition, the algorithm is robust with regard to contingencies, such as unexpected braking at the start of the downhill gradient, because the point in time for when the reference speed $v_{ref\_dhsc}$ is to be set to its increased value $v_{ref\_dhsc\_schwung}$ is not established before the downhill gradient is reached, but is always established on the basis of what the simulations look like in the current situation, that is to say at every discrete simulation time.

According to one embodiment of the invention, the point in time/position of the vehicle when $t=t_0$, that is to say the "current situation", or the concept "now" used in this document, is defined by adding an advance time, for example 1 second, in front of the actual point in time/position of the vehicle. This means that the simulations always take decisions based on current data.

According to one embodiment of the present invention, the reference speed $v_{ref\_dhsc}$ for the downhill speed control system is also governed during the first time period $T_{12}$ in certain circumstances. Here, for example, the reference speed $v_{ref\_dhsc}$ for the downhill speed control system is governed on the basis of a driver selected set speed $v_{set\_dhsc}$ for the downhill speed control system, in such a way that the reference speed $v_{ref\_dhsc}$ normally follows the set speed $v_{set\_dhsc}$. The reference speed $v_{ref\_dhsc}$ can also be governed to deviate from the set speed $v_{set\_dhsc}$ in certain circumstances.

According to one embodiment of the invention, the reference speed $v_{ref\_dhsc}$ for the downhill speed control system is reduced to below the set speed $v_{set\_dhsc}$ for the downhill speed control system if the simulated future speed profile $v_{sim}$ indicates that an actual vehicle speed $v_{act}$ will exceed an infringement speed $v_{sl}$ in connection with the downhill gradient. This reduction takes place before the increased reference speed $v_{ref\_dhsc\_schwung}$ is allocated.

According to one embodiment, the reference speed $v_{ref\_dhsc}$ is reduced to below the set speed $v_{set\_dhsc}$ during the first time period $T_{12}$ at the start of the gradient if the simulated future speed profile $v_{sim}$ indicates that it will exceed the infringement speed $v_{sl}$ for at least the predetermined infringement period $T_{sl}$ in connection with the downhill gradient. In other words, the reference speed $v_{ref\_dhsc}$ is reduced here below the set speed $v_{set\_dhsc}$ during the first time period $T_{12}$ if the future speed profile $v_{sim}$ indicates that an infringement and/or warning may be given, which reduces the risk of an infringement and/or warning being given. For example, this embodiment is shown in FIG. 5.

According to one embodiment, the reference speed $v_{ref\_dhsc}$ is reduced to below the set speed $v_{set\_dhsc}$ during the first time period $T_{12}$ if the simulated future speed profile $v_{sim}$ indicates that it will exceed the increased reference speed $v_{ref\_dhsc\_schwung}$ in the downhill gradient, for example for at least a predetermined infringement period $T_{sl}$ in connection with the downhill gradient. In other words, the reference speed $v_{ref\_dhsc\_schwung}$ is reduced at the start of the gradient if the future speed profile $v_{sim}$ indicates that the increased reference speed $v_{ref\_dhsc\_schwung}$ will be exceeded, which reduces the risk of the driver braking manually, as shown in FIG. 1b, and also reduces the risk of an infringement and/or warning being given. For example this embodiment is shown in FIG. 4.

Of the present invention, at least one future speed profile $v_{sim}$ is simulated on the basis of topographic information and on one magnitude for the excess speed $v_{schwung}$. According to one embodiment of the invention, this excess speed $v_{schwung}$ is established so that the increased reference speed $v_{ref\_dhsc\_schwung}$ for the downhill speed control system will be essentially the same as the set speed $v_{set\_dhsc}$ for the downhill speed control system. This embodiment is illustrated, for example, in FIGS. 4 and 5, in which the initial reference speed $v_{ref\_dhsc\_initial}$ is reduced in relation to the set speed $v_{set\_dhsc}$ during the first time period $T_{12}$ and then at the second point in time $T_2$ is given an increased value which corresponds to the value of the set speed $v_{set\_dhsc}$.

According to one embodiment of the invention, during the first section of the downhill gradient in other words during the first time period $T_{12}$ the reference speed of the downhill speed control system $v_{ref\_dhsc}$ will adopt an initial value of the reference speed $v_{ref\_dhsc\_initial}$, which here corresponds to the set speed $v_{set\_cc}$ for the cruise control system $v_{set\_cc}$ propelling the vehicle, when the reference speed $v_{ref\_cc}$ for the cruise control system propelling the vehicle is less than $v_{set\_cc}$. If the reference speed $v_{ref\_cc}$ is less than the set speed $v_{set\_cc}$ for the cruise control system, the cruise control system will reduce the vehicle speed prior to the downhill gradient. In other words, the cruise control propelling the vehicle is of the look ahead type.

Figure 7:
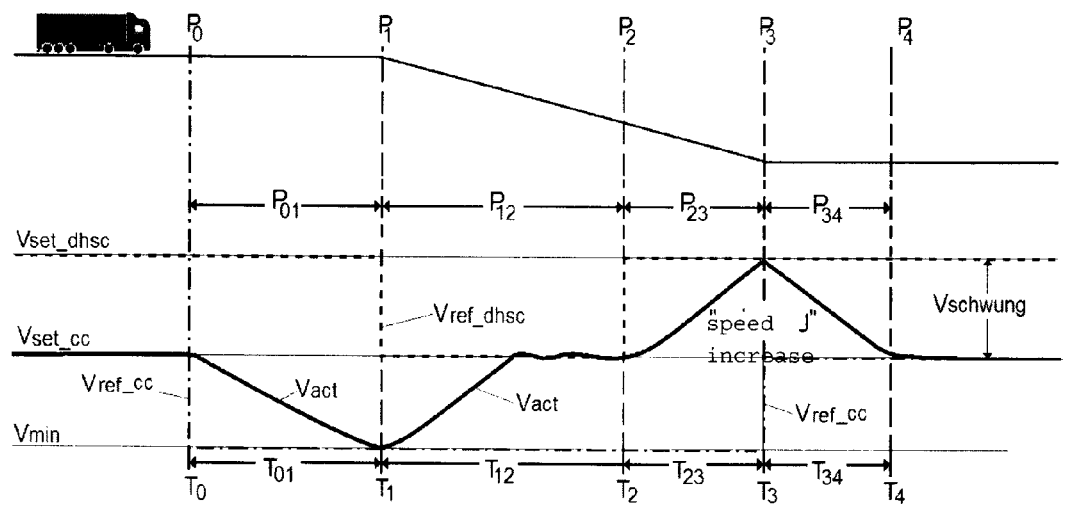

This is illustrated in FIG. 7, in which the reference speed $v_{ref\_dhsc}$ for the downhill speed control system during the first time period $T_{12}$ is essentially the same as the set speed $v_{set\_cc}$ for the cruise control system. In other words, here the initial value of the reference speed $v_{ref\_dhsc\_initial}$ is the same as the set speed $v_{set\_cc}$ for the cruise control system during the first time period $T_{12}$, as described above for FIG. 2b.

In accordance with the method according to the embodiment illustrated in FIG. 2b, the reference speed $v_{ref\_dhsc}$ for the downhill speed control system will be the same as this initial value for the reference speed $v_{ref\_dhsc\_initial}$ until the condition in the second step 202 has been met, that is to say until $v_{sim} < v_{ref\_dhsc\_schwung}$ and/or $T_t < T_{sl}$.

In other words, the increased reference speed $v_{ref\_dhsc\_schwung}$ will be obtained at the second point in time $T_2$, because the future speed profile $v_{sim}$ simulated then indicates that the vehicle will not reach the temporary increased reference speed $v_{ref\_dhsc\_schwung}$, which can be indicated by the system or by the driver, and/or that the infringement time $T_t$, because the simulation of the future speed profile $v_{sim}$ is greater than the infringement speed $v_{sl}$, does not exceed the infringement period $T_{sl}$.

To reduce the risk of the driver needing to intervene after the downhill gradient due to the distance to the vehicle in front being too short, the reference speed of the downhill speed control system $v_{ref\_dhsc}$ will start by being the same as the set speed $v_{set\_cc}$ for the cruise control system on long downhill gradients. This generally means that the distance to the vehicle in front increases before the downhill gradient, which in turn allows a temporary speed increase at the end of the downhill gradient.

According to one embodiment of the invention, the magnitude of the excess speed $v_{schwung}$ depends on a reference speed $v_{ref\_cc}$ for a reference speed governed cruise control system, wherein the reference speed $v_{ref\_dhsc}$ takes account of the cruise control system's governing of its reference speed $v_{ref\_cc}$. In other words, this can mean that the initial value for the reference speed $v_{ref\_dhsc\_initial}$ is not as great as the set speed $v_{set\_cc}$ for the cruise control system.

According to one embodiment, the increased value of the reference speed of the downhill speed control system $v_{ref\_dhsc\_schwung}$ is related to the set speed $v_{set\_cc}$ for the cruise control system with a constant C, that is to say $v_{ref\_dhsc\_schwung} = C^* v_{set\_cc}$, where C has a predetermined value, for example 1.06.

Relating the magnitude of the excess speed $v_{schwung}$ to the set speed or reference speed for the cruise control system achieves a very favourable profile for the actual vehicle speed $v_{act}$. This is illustrated in an example in FIG. 7, in which the governing of the reference speed $v_{ref\_dhsc}$ for the downhill speed control system is coordinated with the function of a reference speed governing cruise control system.

For example, the reference speed governing cruise control system can reduce the reference speed $v_{ref\_cc}$ compared with its set speed $v_{set\_cc}$ prior to the downhill gradient, which means that the actual speed $v_{act}$ drops prior to the downhill gradient, as shown in FIG. 7 (where the reference speed $v_{ref\_cc}$ is a dotted line). The reference speed governing cruise control system can then utilise the acceleration of the vehicle due to its weight on the downhill gradient in order to save fuel. When account is taken of this function in the reference speed governing cruise control system, when governing the reference speed $v_{ref\_dhsc}$ for the downhill speed control system, the magnitude of the increased reference speed $v_{ref\_dhsc\_schwung}$ for the downhill speed control system can be maximised. For example, here the reference speed vref_dhsc for the downhill speed control system can be set to the same as the set speed $v_{set\_cc}$ for the reference speed governing cruise control system, $v_{ref\_dhsc} = v_{set\_cc}$, during the initial period $T_{12}$ of the downhill gradient, as illustrated in FIG. 7. This provides a soft transition from the use of engine torque to braking.

The increased reference speed $v_{ref\_dhsc\_schwung}$ which is achieved using the present invention results, as described above, in an increased actual vehicle speed at the end of the downhill gradient, which also means an increased kinetic energy $W_k$ for the vehicle.

The increased reference speed $v_{ref\_dhsc\_schwung}$ can result in one or more actions being carried out in the vehicle because an increased actual speed is permitted. Such actions comprise the magnitude of a braking force being reduced, that changing up is carried out, that a gear change to neutral is carried out, and that a transition to engine braking is carried out.

According to one embodiment of the invention, the increased reference speed $v_{ref\_dhsc\_schwung}$ is maintained for as long as the actual vehicle speed $v_{act}$ is greater than or equal to the set speed $v_{set\_dhsc}$ for the downhill speed control system. In other words, the reference speed $v_{ref\_dhsc}$ reverts from its increased value $v_{ref\_dhsc\_schwung}$ when the actual vehicle speed $v_{act}$ is once again less than the set speed $v_{set\_dhsc}$ for the downhill speed control system.

Experts will appreciate that a method of governing a reference speed $v_{ref\_dhsc}$ for a downhill speed control system according to the present invention can also be implemented in a computer program, which when executed in a computer will result in the computer carrying out the method. The computer program normally comprises a computer program product (803 in FIG. 8) stored on a digital storage medium, in which the computer program is included in the computer readable medium of the computer program product. Said computer readable medium comprises a suitable non-volatile memory, such as: ROM (Read-Only Memory), PROM (Programmable Read-Only Memory), EPROM (Erasable PROM), Flash memory, EEPROM (Electrically Erasable PROM), a hard disk drive, etc.

According to one aspect of the present invention, a system is provided for governing a reference speed $v_{ref\_dhsc}$ for a downhill speed control system in a vehicle in connection with a downhill gradient. The system is arranged to provide an increased reference speed $v_{ref\_dhsc\_schwung}$ at a final section of the downhill gradient, during the second $T_{23}$ and third $T_{34}$ time period.

According to the present invention, the system comprises a simulation unit which is arranged to simulate at least one future speed profile $v_{sim}$ for the actual vehicle speed over a section of road in front of the vehicle. This at least one future speed profile $v_{sim}$ is based on topographic information.

According to one embodiment of the invention, the at least one future speed profile $v_{sim}$ is based on ignoring any possible effect that the downhill speed control system could have had on the speed profile $v_{sim}$. In other words, for this embodiment, no account is taken of the function of the downhill speed control system during the simulation.

The system also comprises an establishing unit that is arranged to establish whether the reference speed $v_{ref\_dhsc}$ is to be allocated its increased value $v_{ref\_dhsc\_schwung}$. This establishment is carried out on the basis of a comparison of the simulated future speed profile $v_{sim}$ with a permitted magnitude of the increased reference speed $v_{ref\_dhsc\_schwung}$ and/or with an infringement speed $v_{sl}$. In other words, the comparison can be made with the increased reference speed $v_{ref\_dhsc\_schwung}$ on its own, with the infringement speed $v_{sl}$ on its own, or through a combination of these comparisons.

Furthermore, the system comprises an allocation unit that is arranged to increase the reference speed $v_{ref\_dhsc}$ to its increased value $v_{ref\_dhsc\_schwung}$ if the establishment unit has established that this should take place. The simulation, establishment and increase take place "now", which essentially means at the point in time of the establishment, where this space of time comprises the time taken to carry out the simulation, determination and increase.

Here, according to one embodiment, the increased reference speed $v_{ref\_dhsc\_schwung}$ can have a level which, with an excess speed $v_{schwung}$, exceeds an initial level $v_{ref\_dhsc\_initial}$ of the reference speed at a first section of said downhill gradient, during the first time period $T_{12}$, as shown in FIGS. 4, 5 and 7.

Figure 8:
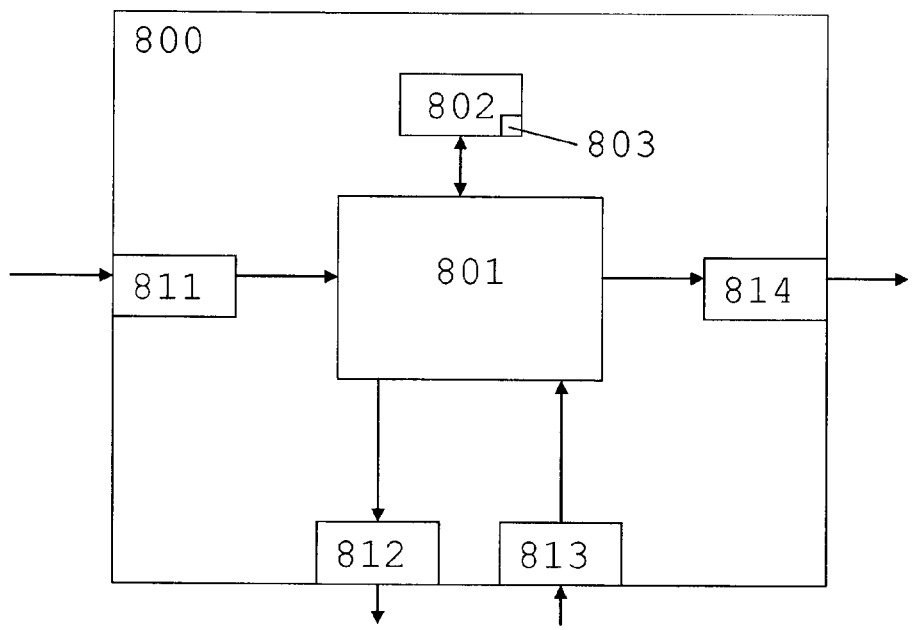

FIG. 8 shows a control unit 800 schematically. The control unit 800 comprises a calculation unit 801, which can essentially comprise a suitable type of processor or microcomputer, e.g. a circuit for digital signal processing (Digital Signal Processor, DSP), or a circuit with a predetermined specific function (Application Specific Integrated Circuit, ASIC). Calculation unit 801 is connected to a data storage unit 802 arranged in the control unit 800, which provides the calculation unit 801 with the stored program code and/or the stored data the calculation unit 801 needs in order to carry out calculations. The calculation unit 801 is also arranged to store part results or end results of calculations in the data storage unit 802.

Furthermore the control unit 800 is provide with devices 811, 812, 813, 814 for the reception and transmission of input and output signals. These input and output signals can comprise waves, pulses or other attributes, which devices 811, 813 for the reception of input signals can detect as information and can be converted into signals that can be processed by calculation unit 801. These signals are then provided to the calculation unit 801. The devices 812, 814 for the transmission of output signals are arranged to convert the signals obtained from the calculation unit 801 to create output signals, for example by modulating the signals, which can be transmitted to other parts of the system for governing the reference speed $v_{ref\_dhsc}$ for a downhill speed control system.

Each of the connections to the devices for the reception and transmission of the input and output signals can comprise one or several of the following: a cable, a data bus such as a CAN bus (Controller Area Network bus), a MOST bus (Media Orientated Systems Transport bus), or some other bus configuration. Or the connection can be wireless.

An expert will appreciate that the aforementioned computer can comprise the calculation unit 801 and that the aforementioned memory can comprise the data storage unit 802.

An expert will also appreciate that the above system can be modified according to the various embodiments of the method of the invention. In addition, the invention relates to a motor vehicle, for example a truck or a bus, comprising at least one system for governing a reference speed $v_{ref\_dhsc}$ for a downhill speed control system according to the invention.

The present invention is not limited to the embodiments of the invention described above, it relates to and comprises all embodiments within the scope of the attached independent claims.

The invention claimed is:

1. A method for governing a reference speed $v_{ref\_dhsc}$ for a downhill speed control system in a vehicle in connection with vehicle travel on a downhill gradient, which enables an increased reference speed $v_{ref\_dhsc\_schwung}$ of the vehicle in a final part of said gradient, the method comprises:
  simulating at least one future speed profile $v_{sim}$ for an actual speed for said vehicle on a section of road in front of said vehicle, wherein said simulation is based on topographic information;
  establishing whether said reference speed $v_{ref\_dhsc}$ is to be allocated said increased reference speed $v_{ref\_dhsc\_schwung}$, wherein said establishing is based on a comparison of said simulated future speed profile $v_{sim}$ with at least one of a permitted magnitude for said increased reference speed $v_{ref\_dhsc\_schwung}$ and an infringement speed $v_{sl}$;
  allocating said increased reference speed $v_{ref\_dhsc\_schwung}$ to said reference speed $v_{ref\_dhsc}$; and
  after said allocating, changing said actual speed for said vehicle on said section of road in front of said vehicle with said speed control system in said vehicle in connection with vehicle travel on a downhill gradient.

2. The method according to claim 1, wherein said establishing is also calculated based on a rule for giving infringements related to speeding violations.

3. The method according to claim 2, wherein said rule for giving infringements puts an infringement into a tachograph in said vehicle if an actual vehicle speed $v_{act}$ exceeds an infringement speed $v_{sl}$ for a predetermined infringement period $T_{sl}$.

4. The method according to claim 2, further comprising giving a warning to a driver of said vehicle of an actual vehicle speed $v_{act}$ exceeding an infringement speed $v_{sl}$ for a predetermined infringement period $T_{sl}$.

5. The method according to claim 1, further comprising governing said reference speed $v_{ref\_dhsc}$ for said downhill speed control system based on a selected set speed $v_{set\_dhsc}$ for said downhill speed control system.

6. The method according to claim 5, further comprising prior to said allocating of said increased reference speed $v_{ref\_dhsc\_schwung}$ reducing said reference speed $v_{ref\_dhsc}$ for said downhill speed control system below said set speed $v_{set\_dhsc}$ for said downhill speed control system, if said simulated future speed profile $v_{sim}$ indicates that an actual vehicle speed $v_{act}$ will exceed an infringement speed $v_{sl}$ for at least a predetermined infringement period $T_{sl}$ in connection with said downhill gradient.

7. The method according to claim 6, further comprising establishing a magnitude of said increased reference speed $v_{ref\_dhsc\_schwung}$ for said downhill speed control system as being essentially the same as said set speed $v_{set\_dhsc}$ for said downhill speed control system.

8. The method according to claim 1, further comprising establishing a magnitude of said increased reference speed $v_{ref\_dhsc\_schwung}$ for said downhill speed control system as being essentially the same as an actual vehicle speed $v_{act}$ which can be permitted without infringing a rule for giving infringements related to speed violations.

9. The method according to claim 1, further comprising allocating said increased reference speed $v_{ref\_dhsc\_schwung}$ to said reference speed $v_{ref\_dhsc}$ when said simulated future speed profile $v_{sim}$ according to the simulation will be less than said infringement speed $v_{sl}$.

10. The method according to claim 9, further comprising said allocating comprising at least once comparing at least one point in time and a current point in time of an infringement time $T_t$, during which said simulated future speed profile $v_{sim}$ according to said simulating will exceed said infringement speed $v_{sl}$, for a predetermined infringement period $T_{sl}$.

11. The method according to claim 1, wherein said establishing of a second point in time $T_2$ when said allocating of said increased reference speed $v_{ref\_dhsc\_schwung}$ to said reference speed $v_{ref\_dhsc}$ takes place comprises comparing an infringement time $T_t$, during which said simulated future speed profile $v_{sim}$ according to the simulation will exceed said infringement speed $v_{sl}$, for a predetermined infringement period $T_{sl}$.

12. The method according to claim 11, wherein said establishing of said second point in time $T_2$ comprises the steps of:
  simulating a first future speed profile $v_{sim\_t0}$ for said vehicle;
  at a current point in time $t_0$ for said vehicle,
  comparing a first infringement time $T_{t0}$ with said infringement period $T_{sl}$, wherein said first infringement time $T_{t0}$ corresponds to a time when said first future speed profile $v_{sim\_t0}$ is simulated to exceed said infringement speed $v_{sl}$, wherein:
  if said first infringement time $T_{t0}$ is shorter than said infringement period $T_{sl}$, $T_{t0} < T_{sl}$,
  setting said second point in time $T_2$ to said current position, $T_2 = t_0$;
  if said first infringement time $T_{t0}$ is equal to or longer than said infringement period $T_{sl}$, $T_{t0} > T_{sl}$, leaving said reference speed $v_{ref\_dhsc}$ unchanged and further simulating at least one future speed profile $v_{sim\_t1}$, $v_{sim\_t2}$ for said vehicle, based on a further current point in time $t_1$, $t_2$ to which said vehicle has moved since said current position $t_0$;
  comparing at least one further infringement time $T_{t1}$, $T_{t2}$ with said infringement period $T_{sl}$, where said at least one further infringement time $T_{t1}$, $T_{t2}$ corresponds to a time when said first future speed profile $v_{sim\_t0}$ is simulated to exceed said infringement speed $v_{sl}$, wherein:

if said at least one further infringement time $T_{t1}$, $T_{t2}$ is shorter than said infringement period $T_{sl}$, $T_{t1}<T_{sl}$, or $T_{t2}<T_{sl}$, setting said second point in time $T_2$ to said current point in time position, $T_2=t_1$ or $T_2=t_2$ and if said at least one further infringement time $T_{t1}$, $T_{t2}$ is equal to or longer than said infringement period $T_{sl}$, $T_{t1}>T_{sl}$, or $T_{t2}>T_{sl}$, leaving said reference speed $v_{ref\_dhsc}$ unchanged and performing at least one further simulation of a future speed profile.

13. The method according to claim 1, further comprising performing said allocating of said reference speed $V_{ref\_dhsc}$ to said increased reference speed $v_{ref\_dhsc\_schwung}$ if said simulated future speed profile $v_{sim}$ remains less than said increased reference speed $v_{ref\_dhsc\_schwung}$.

14. The method according to claim 1, further comprising coordinating said control of said reference speed $v_{ref\_dhsc}$ with a control carried out by a cruise control system for setting said reference speed $v_{ref\_dhsc}$ to a value corresponding to a set speed $v_{set\_cc}$ for said cruise control system.

15. The method according to claim 1, further comprising coordinating said control of said reference speed $v_{ref\_dhsc}$ for said downhill speed control system with a function for a reference speed governing cruise control system for maximizing said magnitude of said increased reference speed $v_{ref\_dhsc\_schwung}$.

16. The method according to claim 15, further comprising controlling said reference speed $v_{ref\_dhsc}$ for said downhill speed control system taking account of a reduction of said reference speed $v_{ref\_cc}$ for said reference speed governing cruise control system prior to said downhill gradient.

17. The method according to claim 16, further comprising temporarily reducing said reference speed $v_{ref\_dhsc}$ for said downhill speed control system to an initial level $v_{ref\_dhsc\_initial}$ for said reference speed, if said simulated future speed profile $v_{sim}$ indicates that an actual vehicle speed $v_{act}$ will exceed an infringement speed $v_{sl}$ for at least a predetermined infringement period $T_{sl}$ in connection with said downhill gradient.

18. The method according to claim 16, further comprising temporarily reducing said reference speed $v_{ref\_dhsc}$ for said downhill speed control to an initial level $v_{ref\_dhsc\_initial}$ for said reference speed if said simulated future speed profile $v_{sim}$ is at least partially greater than or equal to said increased reference speed $v_{ref\_dhsc\_schwung}$.

19. The method according to claim 18, wherein said increased reference speed $v_{ref\_dhsc\_schwung}$ has a level which, with an excess speed $v_{schwung}$, exceeds an initial level $v_{ref\_dhsc\_initial}$ of said reference speed at a first section of said downhill gradient.

20. The method according to claim 19, further comprising permitting said reference speed $v_{ref\_dhsc}$ to retain its increased value $v_{ref\_dhsc\_schwung}$ until an actual vehicle speed $v_{act}$ is less than a set speed $v_{set\_dhsc}$ for said downhill speed control system.

21. The method according to claim 20, wherein said increased reference speed $v_{ref\_dhsc\_schwung}$ for said downhill speed control system causes at least one action in a group consisting of:
  reducing a magnitude of a braking force acting in said vehicle;
  performing a gear change in said vehicle into a higher gear;
  performing a gear change in said vehicle to neutral gear; and
  performing a transition to engine braking of said vehicle.

22. The method according to claim 18, wherein said increased reference speed $v_{ref\_dhsc\_schwung}$ causes an increased actual vehicle speed at the final section of said downhill gradient, compared with an actual vehicle speed $v_{act}$ which had resulted in said initial reference speed $v_{ref\_dhsc\_initial}$ for said downhill speed control system, wherein said increased actual vehicle speed means that said vehicle leaves said downhill slope with increased kinetic energy $W_k$.

23. The method according to claim 1, wherein said simulation of said at least one future speed profile $v_{sim}$ is based on ignoring the effect of said downhill speed control system.

24. A system for governing a reference speed $v_{ref\_dhsc}$ for a downhill speed control system in a vehicle, in connection with a downhill gradient, wherein said system is configured and operable to provide an increased reference speed $v_{ref\_dhsc\_schwung}$ in a final part of said gradient, said system comprising:
  a simulation unit configured to simulate at least one future speed profile $v_{sim}$ for an actual speed for said vehicle on a section of road in front of said vehicle, where said simulation is based on topographic information;
  an establishment unit configured to establish whether said reference speed $v_{ref\_dhsc}$ is to be allocated said increased reference speed $v_{ref\_dhsc\_schwung}$,
  wherein said establishment unit is configured to compare said simulated future speed profile $v_{sim}$ with at least one of a permitted magnitude for said increased reference speed $v_{ref\_dhsc\_schwung}$ and an infringement speed $v_{sl}$, and
  an allocation unit configured to allocate said increased reference speed $v_{ref\_dhsc\_schwung}$ to said reference speed $v_{ref\_dhsc}$,
  wherein said downhill speed control system is configured to change said actual speed, for said vehicle on said section of road in front of said vehicle in connection with vehicle travel on a downhill gradient.

* * * * *